United States Patent Office 3,480,600
Patented Nov. 25, 1969

3,480,600
SHAPED ARTICLES MADE FROM ACRYLONITRILE AND NEOPENTYL TRIBROMO ACRYLATES
Charles T. Pumpelly, Midland, Joseph J. Pedjac, Mount Pleasant, and John S. Somerville, Midland, Mich., assignors to The Dow Chemical Company, Midland, Mich., a corporation of Delaware
No Drawing. Filed Apr. 24, 1967, Ser. No. 632,919
Int. Cl. C08f 15/38, 47/12
U.S. Cl. 260—85.5     3 Claims

ABSTRACT OF THE DISCLOSURE

This application deals with fire-retardant, shaped articles, such as fibers and films, made from an interpolymer of at least 85 weight percent acrylonitrile and enough of a neopentyl tribromo ester of an acrylic acid to provide from 2 to 10 weight percent bromine in the interpolymer.

---

This invention relates to shaped articles, especially filamentary structures having durable, flame-resistant properties.

The flame-proofing of normally flammable materials including, for example, textiles and other fabric materials by the application of flame-proofing finishes, the incorporation of flame-retardant additives and by other known treatments is not new. It is known that the halogen content of halogenated organic compounds often has an effect of reducing the flammability both of the compound containing the halogen and of flammable, organic materials intimately admixed therewith. However, a considerable number of the organic halides will decompose at temperatures lower than the combustion point of compositions comprising the same. Other halogen compounds show other difficulties. Each such halogenated flame-proofing agent seems to suffer from one or more disadvantages, such as solubility, thermal instability, incompatibility and others.

Accordingly, it is an object of the present invention to provide new shaped articles having improved flame resistance.

The objects of this invention are attained with flame-resistant films and fibers produced from an acrylonitrile interpolymer wherein acrylonitrile comprises at least 85 weight percent of the interpolymer and the acrylate ester from about 3 to 16 mole percent or enough monomer to provide from 2 to 10 weight percent bromine. Any balance of the interpolymer may be of one or more monoethylenically unsaturated monomers copolymerizable with acrylonitrile.

The flame-retarding agents, which impart the desirable properties to the articles of this invention, fall within the class of halogenated, aliphatic acid esters of acrylic and methacrylic acid and may be represented by the general formula

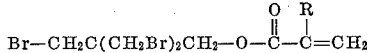

wherein R represents H and CH$_3$. The halogen portion of the compounds must be bromine, since the other halogens have been found to be generally unsatisfactory from a viewpoint of economics and compatibility with other plastic products.

Those acrylate esters may be prepared by standard esterification techniques wherein the appropriate alcohol is esterified with the desired carboxylic acid as shown, for example, in U.S. 3,165,502, issued Jan. 12, 1965. The reaction may be carried out in suitable solvents using conventional esterification catalysts. The use of polymerization inhibitors, such as hydroquinone and the methyl ether of hydroquinone, in the esterification reaction will prevent premature polymerization of the unsaturated compounds. The solvent may be removed by distillation at reduced pressure to give the pure product. The choice of alcohol, acid, solvent, catalysts and inhibitor will be known to the skilled worker.

The copolymerization of the esters with acrylonitrile may be carried out with conventional methods including mass, suspension, emulsion, and solution techniques employing elevated temperatures and free radical catalysis to induce polymerization. Typical of the comonomers with which these acrylate esters and acrylonitrile may be interpolymerized are the alkenyl aromatic monomers, such as styrene and vinyl toluene, acrylate and methacrylate esters, such as ethyl acrylate and methyl methacrylate, vinyl chloride, vinylidene chloride, vinyl ethers, open-chain conjugated dienes, such as butadiene, and olefins, such as ethylene and propylene. The ester compounds find special utility and are particularly well adapted for copolymerization with acrylonitrile in saline solution to make a polymer solution useful for the salt spinning of fibers.

Polyacrylonitrile and many of the fiber and film-forming copolymers of acrylonitrile, including those of this invention, may advantageously be fabricated by a wet spinning process wherein the polymer composition is extruded from compositions of the polymer and polyacrylonitrile-dissolving aqueous saline solvents, particularly aqueous solutions of zinc chloride and its saline equivalents as shown in U.S. 2,648,649 and others. The products may be fabricated by other known procedures, such as spinning from dimethyl formamide and other organic solvents. Films and similar continuous coherent articles may be prepared by conventional casting techniques.

To achieve flame retardancy in the acrylonitrile interpolymer, it is necessary that enough of the acrylate ester of this invention be present to provide from about 2 to 10 weight percent bromine. Four to 8 percent bromine is a preferred range. Other non-copolymerized, fire-retardant agents can be used in conjunction with compounds of this invention. In that event, less bromine and thus less of the acrylate ester monomer need be present than when the acrylate ester is the sole fire-retardant agent. Typical of those non-copolymerized agents is antimony trioxide.

The usual additives incorporated in plastic formulations for specific functions may be employed in the plastic products of this invention. Representative of those additives are pigments, dyes, light and heat stabilizers, fillers, and other similar materials.

The concept of the invention will be illustrated in detail by the following example which are not intended to be limiting.

Example 1

To a 1 liter, round bottom flask was added 112 g. (.345 mole) of 3-bromo-2,2-bis(bromomethyl)-propane-1-ol, 27.6 g. (.384 mole) of acrylic acid, 400 ml. of ethylene chloride, 1 g. of p-methoxyphenol, and 1 g. of concentrated sulfuric acid. The reaction flask was equipped with a azeotropic distillation head in which water from the esterification was removed, separated from the solvent, and the solvent continuously returned to the reaction mixture. The reaction was allowed to proceed for a period of seventeen hours during which time the theoretical amount of water was removed. After cooling, the reaction mixture was washed with ice water, then with dilute aqueous sodium bicarbonate solution, and separated from the aqueous phase. The solvent was removed by distillation at reduced pressure. When the monomer was subjected to a temperature of 100° C. at 1 mm. Hg pressure and cooled, a yield of 99 percent of the crude monomer was obtained.

When it was desirable to purify the monomer, a distillation at reduced pressure was carried out, B.P. 138–141° C./1.25–3 mm. Hg. Under these conditions, some thermopolymerization occurred which resulted in quite low yields of the monomer. The polymer obtained under these conditions varied from a semi-solid, low molecular weight material soluble in dimethylformamide to a non-crystalline-appearing solid of apparently higher molecular weight which was essentially insoluble in dimethylformamide at room temperature. Neither of these materials suffered from thermal decomposition even after being held at 200° C. for a period of time.

Example 2

To a 350 ml. citrate bottle was added 175 ml. of freshly boiled, distilled water, 22 g. (.33 mole) of acrylonitrile, .3 g. of $K_2S_2O_8$ in 10 ml. of boiled, distilled water, and 5 g. (.0154 mole) of 3-bromo-2,2-bis(bromomethyl)propyl acrylate. The bottle was purged with nitrogen while loading, then sealed off and placed in a water bath at 50° C. for three hours during which time it was tumbled for agitation. After cooling, the solid polymer was removed by filtration, washed with water, then acetone, and dried to give 26.7 g. of white copolymer. Analysis of the copolymer indicated 9.3 percent Br. This is equivalent to 14.7 mole percent bromine-containing monomer in the copolymer. A sample of the copolymer (3 g.) was placed in a test tube with 27 ml. of cold dimethylformamide. After warming the mixture to 35–40° C., the copolymer went into solution.

For the flame-retardant test, a 2 inch diameter disc was prepared in the following manner. Two grams of the copolymer, previously ground to pass a 40 mesh screen, was placed in a 2 inch die and subjected to 15 tons of force in a hydraulic press. The disc was clamped in a 45 degree angle to the horizontal position and the upper edge ignited with a Bunsen flame. The Bunsen flame was removed and time recorded for the sample to self extinguish.

The copolymer containing 2,2-bis(bromomethyl)-3-bromo-propyl acrylate was self-extinguished in eight seconds, while one containing 3 - bromo - 2,2 - bis(bromomethyl)propyl methacrylate (8.15 percent Br) was self-extinguishing in 12 seconds. A polyacrylonitrile sample prepared in the same manner was consumed in 100 seconds. It has thus been shown that copolymers of the subject monomers with acrylonitrile are useful, self-extinguishing copolymers which are soluble in dimethylformamide and in which a spinning dope may be prepared at 35–40° C. The materials have displayed excellent thermal stability since they have suffered no apparent degradation when held at 200° C. for a period of time.

Example 3

A reaction vessel equipped with a stirrer and a thermometer was placed in a constant temperature bath at 55° C. To the vessel was added a mixture of 1500 parts of 60 percent aqueous zinc chloride solution containing 2.5 p.p.m. $Fe^{+3}$ and 0.21 p.p.m. $Cu^{++}$, 179 parts of acrylonitrile and 16 parts of 3-bromo-2,2-bis(bromomethyl)propyl acrylate (TBNPA). The pH of the zinc chloride solution (10:1 dilution) was 2.5. The reaction was initiated by the addition of 0.2 parts of hydrogen peroxide. The conditions and quantities were chosen so as to obtain a spinnable composition: 1000–2000 poise at 22 degrees (Brookfield viscometer) and 8–10 percent solids.

After stirring the mixture for 3–9 hours, the polymer solution was debubbled to remove unreacted acrylonitrile and dissolved gas, and then extruded through a multi-orifice spinnerette into a coagulation bath of a 44 percent aqueous zinc chloride solution at 17° C. The so-coagulated filaments were washed with water to reduce their salt content and then stretched about 1000 percent while passing through a hot water bath maintained at a temperature of 99.5° C. The filaments were then dried in a relaxed state in an oven set at about 125° C. Analysis of the fibers indicated that 4.06 percent Br or 6.3 percent TBNPA is present. One gram of fiber was chopped up in a Wiley mill, placed in a die 1¼ inches in diameter, and pressed into a disc at 24,000 p.s.i.g. in a press. The disc was then clamped at an angle of 45 degrees to the horizontal, and the upper edge was ignited with a propane torch. As soon as the disc ignited, the torch was removed, and a timer was started. The time to self-extinguishment or complete combustion was measured and recorded. A comparison of the burning times of the Br-containing polymer with pure polyacrylonitrile prepared in the same way is shown below.

| Polymer: | Burning time, sec. |
| --- | --- |
| PVCN | 152±6 |
| PVCN-TBNPA copolymer containing 4.06 percent Br | 35±3 |

In like manner, similar results are obtained when all ratios of copolymers of at least 85 weight percent acrylonitrile and the remainder of a brominated acrylate ester heretofore defined were spun into fibers or cast into films.

What is claimed is:
1. A continuous, coherent article consisting of a fiber or film made from an interpolymer comprising at least 85 weight percent acrylonitrile and an amount of an acrylate ester monomer having the general formula:

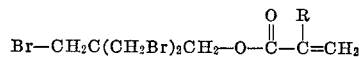

wherein R is hydrogen or methyl, to provide from 2 to 10 weight percent bromine in said interpolymer.

2. The article claimed in claim 1 wherein said acrylate ester monomer is 3-bromo-2,2-bis(bromomethyl)propyl acrylate.

3. The article claimed in claim 2 wherein said article is a salt spun acrylic fiber.

References Cited

UNITED STATES PATENTS 2,492,170 12/1949 Mast et al.
3,174,959 3/1965 Ferington _____ 260—85.5 X HARRY WONG, Jr., Primary Examiner U.S. Cl. X.R.

260—45.75, 80.7, 80.76, 80.81, 486; 264—182, 206